(12) United States Patent
Larsson et al.

(10) Patent No.: US 6,302,476 B1
(45) Date of Patent: Oct. 16, 2001

(54) FRONT STRUCTURE IN A VEHICLE

(75) Inventors: Johnny K Larsson, Gothenburg; Clas Jernström, Askim, both of (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/308,326

(22) PCT Filed: Nov. 21, 1997

(86) PCT No.: PCT/SE97/01960

§ 371 Date: May 19, 1999

§ 102(e) Date: May 19, 1999

(87) PCT Pub. No.: WO98/22327

PCT Pub. Date: May 28, 1998

(30) Foreign Application Priority Data

Nov. 21, 1996  (SE) .................................................... 9604275

(51) Int. Cl.⁷ .................................................... B62D 21/15
(52) U.S. Cl. ...................... 296/188; 296/189; 296/203.01
(58) Field of Search .................................. 296/188, 189, 296/203.01, 204; 280/784; 180/274

(56) References Cited

U.S. PATENT DOCUMENTS

| | | | |
|---|---|---|---|
| 3,842,930 | * 10/1974 | Fiala | 180/274 |
| 3,893,726 | * 7/1975 | Strohschein | 293/133 |
| 4,050,537 | 9/1977 | Bez . | |
| 5,460,421 | * 10/1995 | Culbertson | 293/133 |
| 5,727,815 | * 3/1998 | Smith | 280/784 |
| 6,019,419 | * 2/1999 | Browne | 296/189 |

FOREIGN PATENT DOCUMENTS

| | | |
|---|---|---|
| 0 278 912 | 8/1988 | (EP) . |
| 0 788 930 | 8/1997 | (EP) . |

* cited by examiner

*Primary Examiner*—Stephen T. Gordon
*Assistant Examiner*—P. Engle
(74) *Attorney, Agent, or Firm*—Kilpatrick Stockton LLP

(57) ABSTRACT

Front structure in a vehicle, comprising a pair of spaced longitudinal box-shaped lateral beams (2), to which explosive charges (10) are fixed. With the aid of retardation sensors (20), a control unit (21) and detonators (22), the explosive charges are triggered in a collision after a certain crumpling deformation distance of the front portion of the beams to weaken the beams and prevent buckling and thus extend the crumpling deformation distance to the beam section lying therebehind. The controlled unit is arranged to compare the signals from the retardation sensors and activate the detonators only if the difference between the signals is below a predetermined value indicating relatively symmetrical frontal collision.

17 Claims, 5 Drawing Sheets

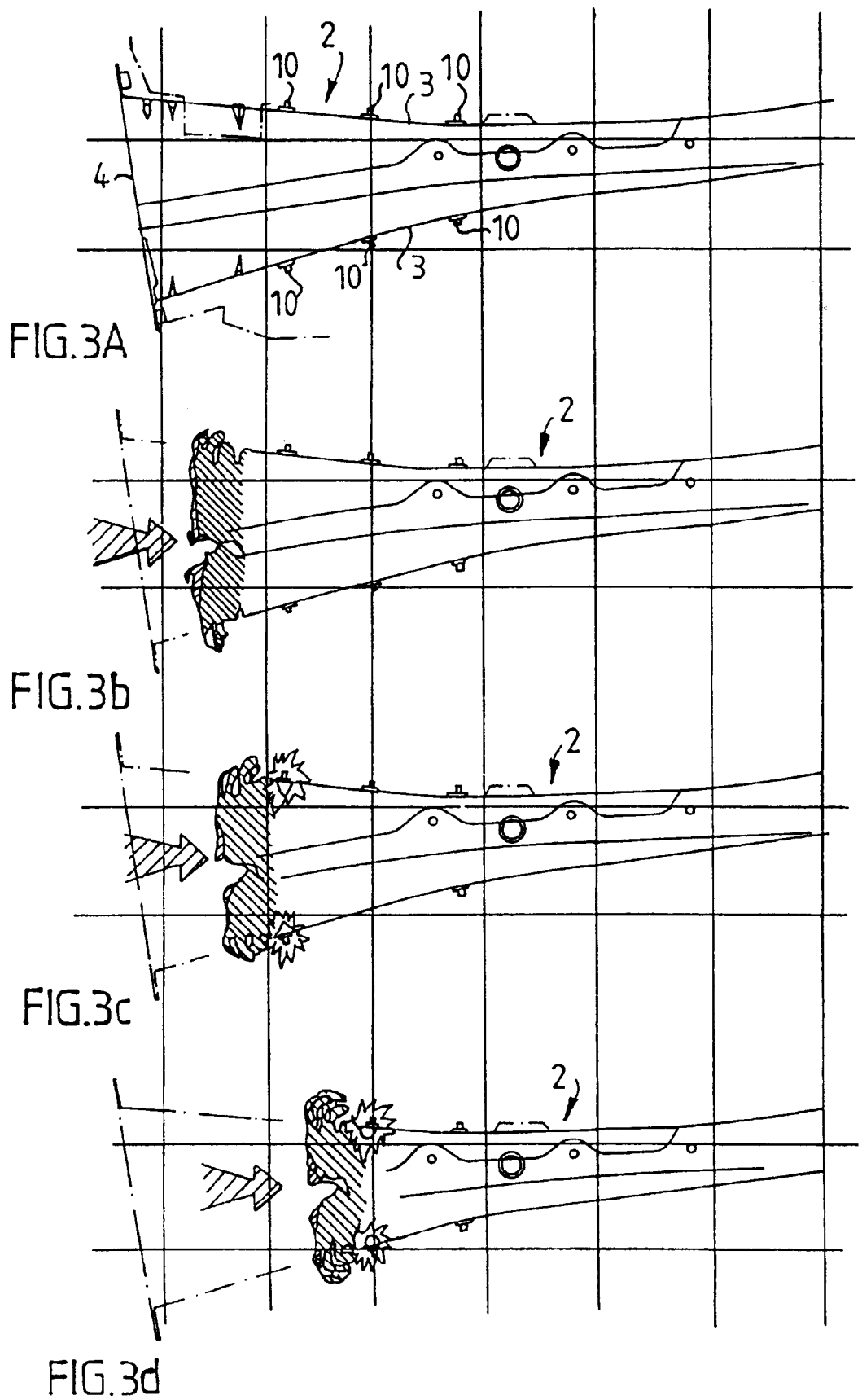

FRONT STRUCTURE IN A VEHICLE

The present invention relates to a frontal structure in a vehicle, comprising a pair of laterally spaced beams, each comprising a sheet metal box element having greater length than both width and height, and having a portion which is oriented in the longitudinal direction of the vehicle, as well as means for sensing the retardation of the vehicle during a collision and, as a function thereof, changing the rigidity of the beam in its longitudinal direction.

Box beams are used in a number of different applications in automobiles, for example, as the front side members in passenger car chassis, and are thus components whose design crucially affects the crash safety of the vehicle. In attempting to achieve high crash safety, it has always been striven for, by a controlled crash sequence, to force as far as possible the elements in the structure to be deformed in the most energy-absorbing manner, which is progressive upsetting or crumpling. Less energy-absorbing reactions such as rotation, buckling or bending should thus be avoided.

Ideally, from a collision safety point of view, the volume represented by the front portion of the vehicle should consist of a large number of cells, each of which having a large energy-absorbing capacity, regardless of from which direction the vehicle is struck, but such solutions have not been applicable in mass production for a number of reasons.

Normally, the beam system in a vehicle is regarded as a passive security system where it is primarily the geometric shape of the box-shaped beams which, by virtue of their energy-absorbing capacity, determine the collision security. It is, however, known to arrange an "active" beam system in a vehicle, i.e. a system where a collision triggers an activity which makes the beam system perform in a manner exceeding its normal mechanical limits. Such an active beam arrangement is known, e.g. by U.S. Pat. No. 4,050,537. Here, an explosive charge is used to change, in a collision, the cross section of a box beam in such a manner that its rigidity, and thus its energy-absorbing capacity, increases.

The purpose of the present invention is to develop a frontal structure with an active beam system making it possible to adapt deformation and energy-absorbing capacity to various collision situations.

This is achieved according to the invention by virtue of the fact that the beams are each coordinated with an individual retardation sensor, each disposed to send an individual retardation-dependent signal to a control unit, which is disposed to compare the signals and activate said means to change the rigidity of the beams depending on the difference between the signals from the retardation sensors.

The invention creates an active frontal structure where technology which is known per se is used in an entirely new manner, built on the idea of dimensioning the beams for a certain collision situation requiring a certain rigidity and changing the rigidity of the beams for collision situations in which another rigidity is desirable.

The invention is in particular directed to a frontal structure in which the rigidity of the beams, which dictates the deformation sequence and the energy-absorbing capacity, can be adapted to a more or less symmetrical frontal collision and to a so-called offset collision, i.e. a collision with a vehicle or object which strikes essentially to one side of the longitudinal center-plane of the vehicle.

In one embodiment, the beams can be dimensioned for offset collision, requiring great rigidity, since the entire, or most, deformation energy must be absorbed by only one of the beams. In a symmetrical frontal collision, the deformation energy is distributed between the beams, and the optimum absorption is obtained in this case by reducing the rigidity of the beams.

The beams in the frontal structure are thus active. By studying the deformation of a passive beam after a collision, it is possible to determine where the transition occurred between upsetting or crumple-fold-formation and buckling of the entire beam, for example. By actively softening the beam in this are, for example with the aid of small pyrotechnical charges, the buckling can be avoided and the crumple-fold-formation distance can thus be extended over the softened area to the area behind it, which can be more rigid.

In another embodiment, the beams can be dimensioned with a cross-sectional profile which provides optimum rigidity during a symmetrical frontal collision, the means for changing the rigidity of the beams being disposed in an offset collision to increase the rigidity by changing the cross-sectional profile, as disclosed in U.S. Pat. No. 4,050, 537.

The invention will be described in more detail below with reference to examples shown in the accompanying drawings, where FIG. 1 shows a perspective view of a first embodiment of a frontal structure according to the invention of a schematically indicated passenger car;

FIGS. 3a–3d are views from above of a portion of the beam in FIG. 2a in various states of deformation;

Figure 1:
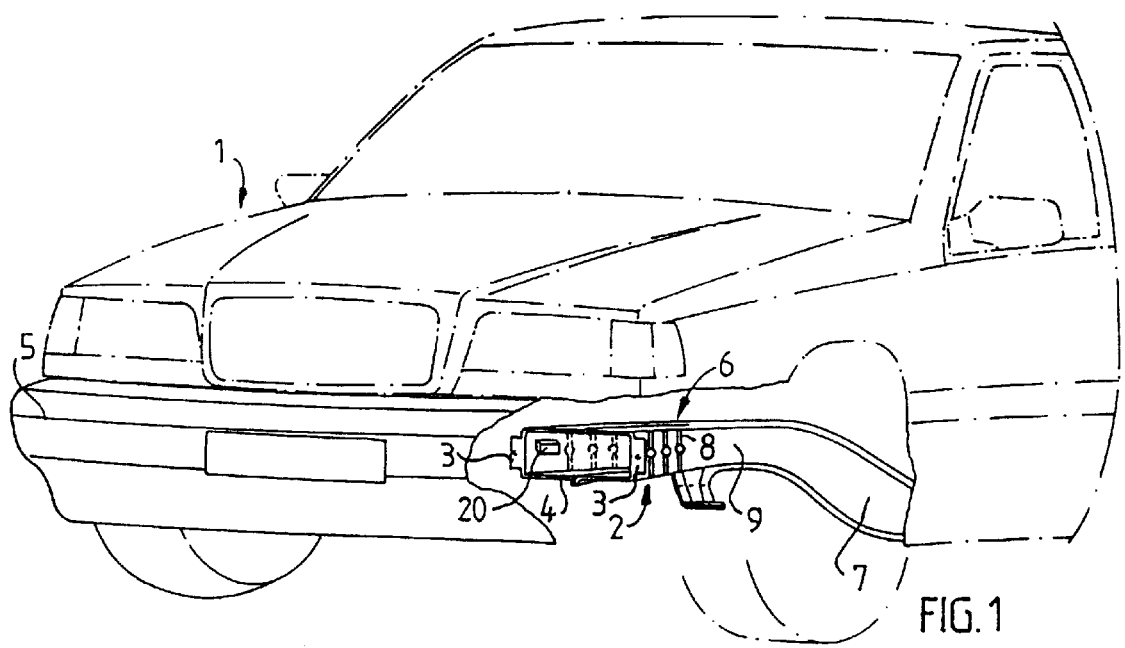
Figure 4:
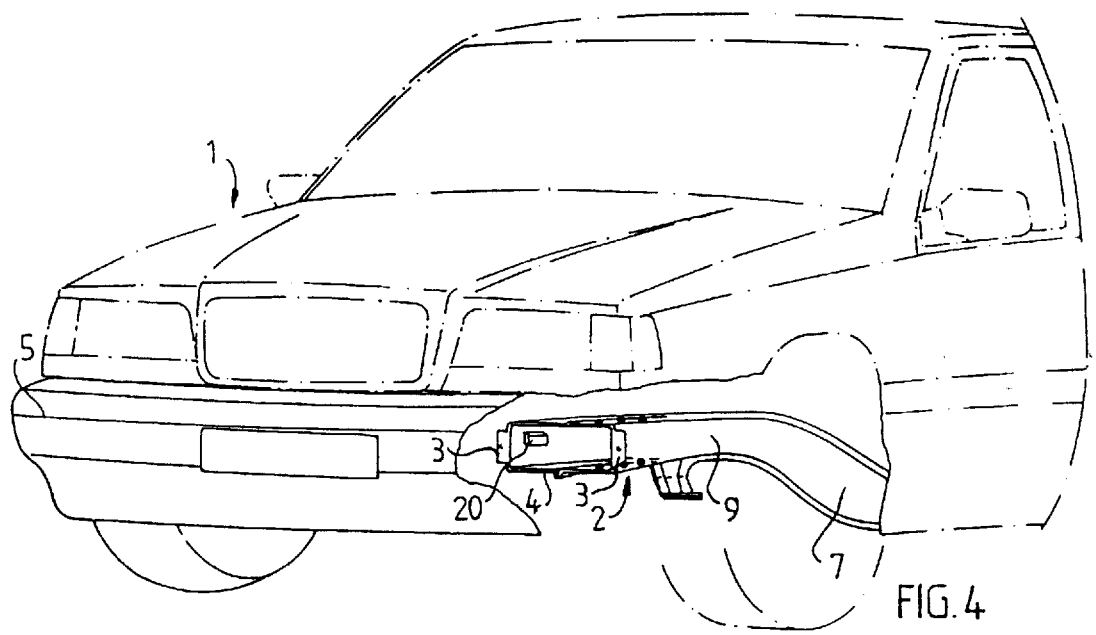
FIG. 4 is a perspective view corresponding to FIG. 1 of a second embodiment.

In FIGS. 1 and 4, 1 designates a vehicle body of so-called self-supporting type. A box beam, generally designated 2, is one of two side beam members fixed symmetrically relative to the longitudinal center-plane of the automobile. The beam 2 consists of two U-profiles 3, which are joined to each other by spot-welding to form a rectangular box profile. The beam shown, and its general construction and function are well known and need not be described in more detail here. It should suffice to say that in one car model available on the market, the lateral beams serve as supports for an intermediate frame, which in turn supports the engine. As can be seen in the Figures, the beam is tapered to the shape of a horn. Its end 4 (to the left in the Figures) is joined to the front bumper 5 (FIGS. 1 and 4). From its straight forward portion, which extends in the longitudinal direction of the vehicle, the beam curves into a curved rear portion 7, which is joined to the bottom plate of the vehicle.

Figure 2A:
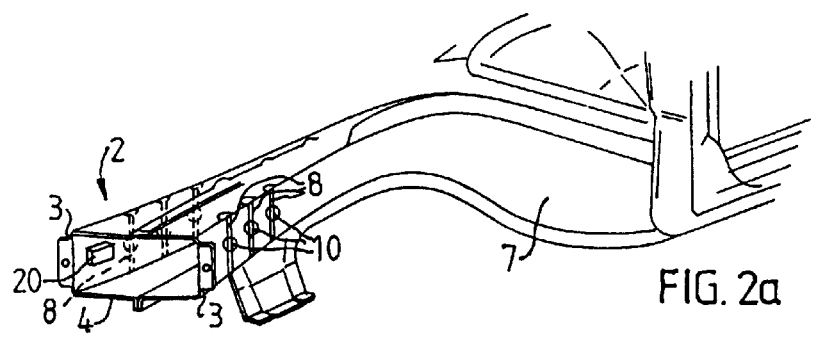
FIGS. 2a and 2b show perspective views of the beam construction of the frontal structure prior to and after a certain deformation.
Figure 2B:
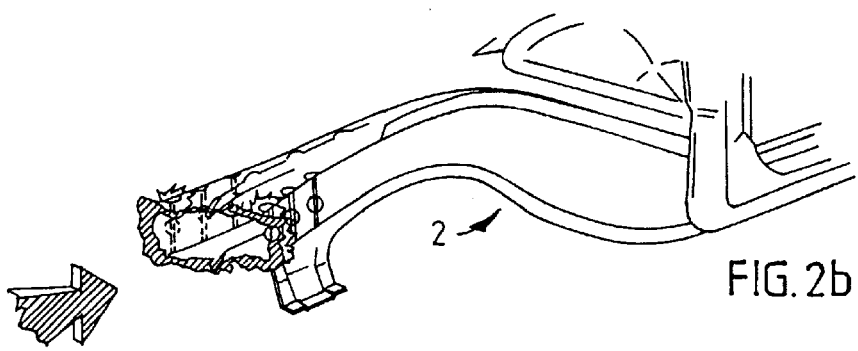

Each beam 2 in the embodiment shown in FIGS. 1–3, has stamped indentations 8 in the facing vertical beam sides 9. Small explosive charges 10 are fixed in the indentations. The indentations 8 with the explosive charges 10 are arranged in a section which must be temporarily prevented from buckling and the beams are dimensioned here to support the structure in front of it so that it is exploited effectively for energy absorption by optimizing the upsetting or crumple-fold-formation process. When the deformation reaches the portion with the explosive charges 10, these are activated sequentially to weaken the beams and prevent them from buckling so that the upsetting or crumple-fold-formation sequence and the energy absorption can continue in the beam portion therebehind.

A retardation sensor in the form of an accelerometer 20 is mounted at the front end of each beam 2. This can be of the type used to trigger airbags. The accelerometers 20 on the beams 2 are coupled to a control unit, e.g. a microprocessor 21, to which the electrically activated detonators 22 for the explosive charges 10 are also connected. The control unit 21 is programmed to control the triggering of the explosive charges on the respective beam sequentially, as is shown in FIGS. 3*a*–3*d*, depending on the signals from the accelerometers 20.

The control unit 21 is disposed to compare the signals from the accelerometers 20 with each other and to activate the detonators 22 in accordance with a pattern dependent on the differential signal. For example, the control unit 21 can be programmed to trigger the explosive charges 10 of both beams 2 simultaneously at a certain moment, if the differential signal drops below a certain predetermined value indicating a relatively symmetrical frontal collision, where both beams 2 are to be employed at the same time for energy absorption. If the differential signal is large, indicating a so-called offset collision, the beam 2 on the impact side during the collision must absorb greater force and more energy and therefore, depending on the crash sequence, it can be advantageous to not trigger the explosive charges at all or to trigger them at another point in time than for symmetrical frontal collision. This presupposes that the beams 2 are optimized for offset collision, which means that weakening of the beams will be necessary in symmetrical collision, in order to be able to optimally exploit the entire available deformation distance.

Figure 5A:
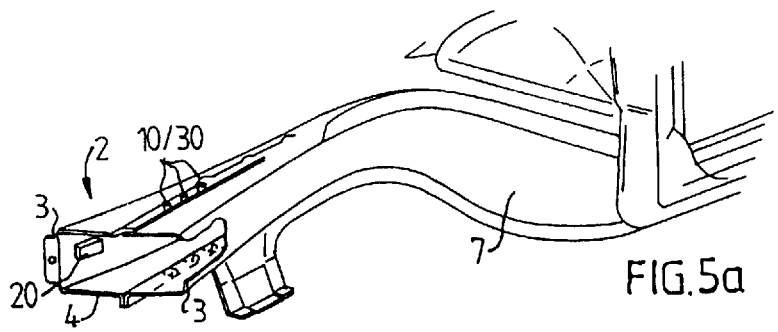
FIGS. 5a and 5b are views corresponding to FIGS. 2a,2b of the embodiment in FIG. 4.
Figure 5B:
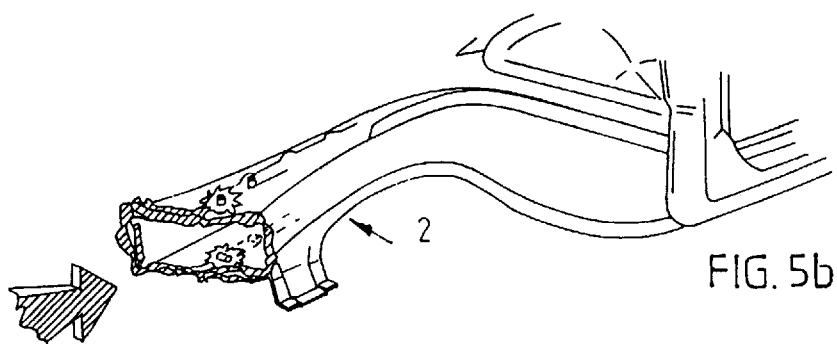
Figures 6A, 6B, 6C, 6D:
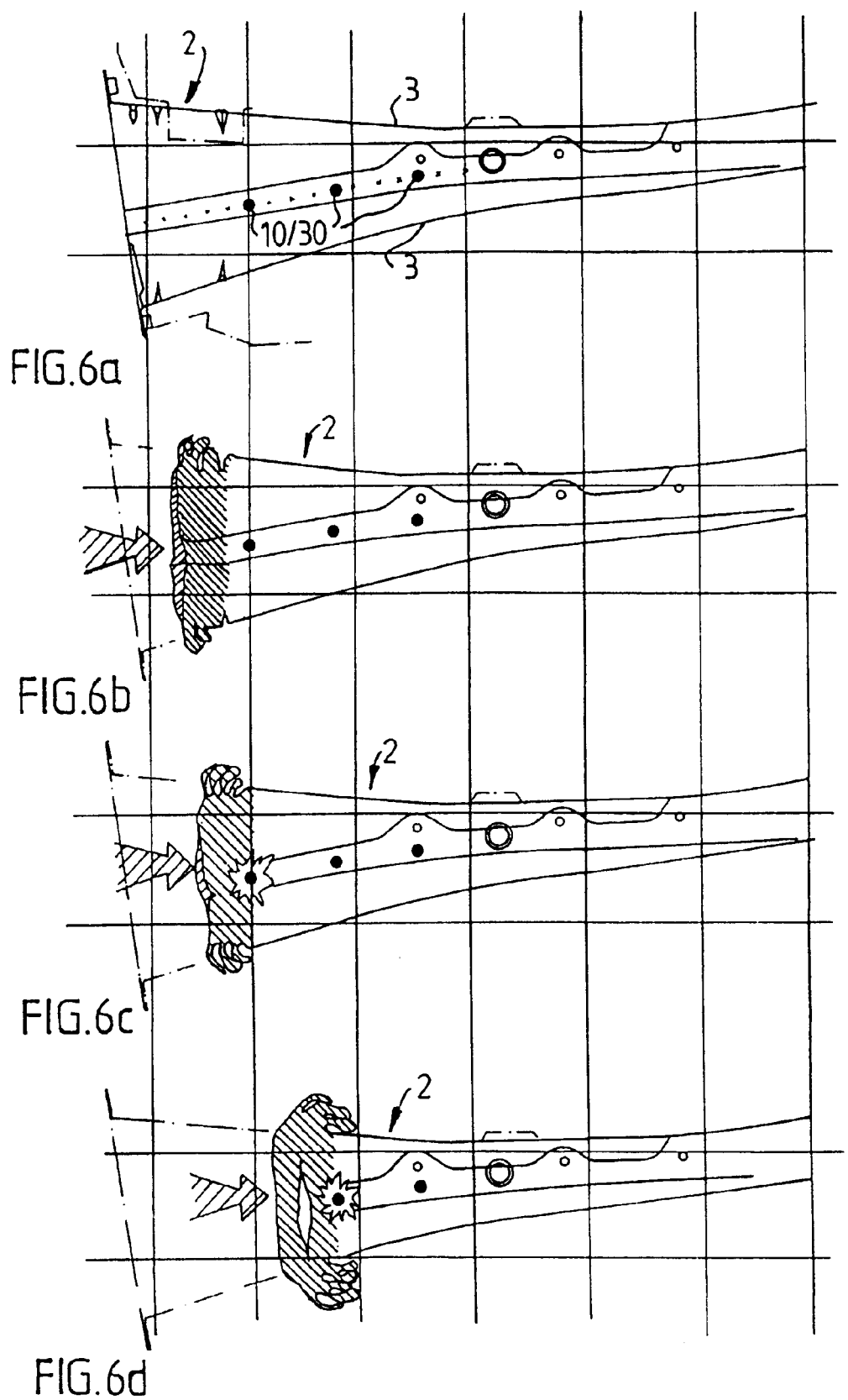
FIGS. 6a–6d are views corresponding to FIGS. 3a–3d of the embodiment in FIG. 4.
Figure 7:
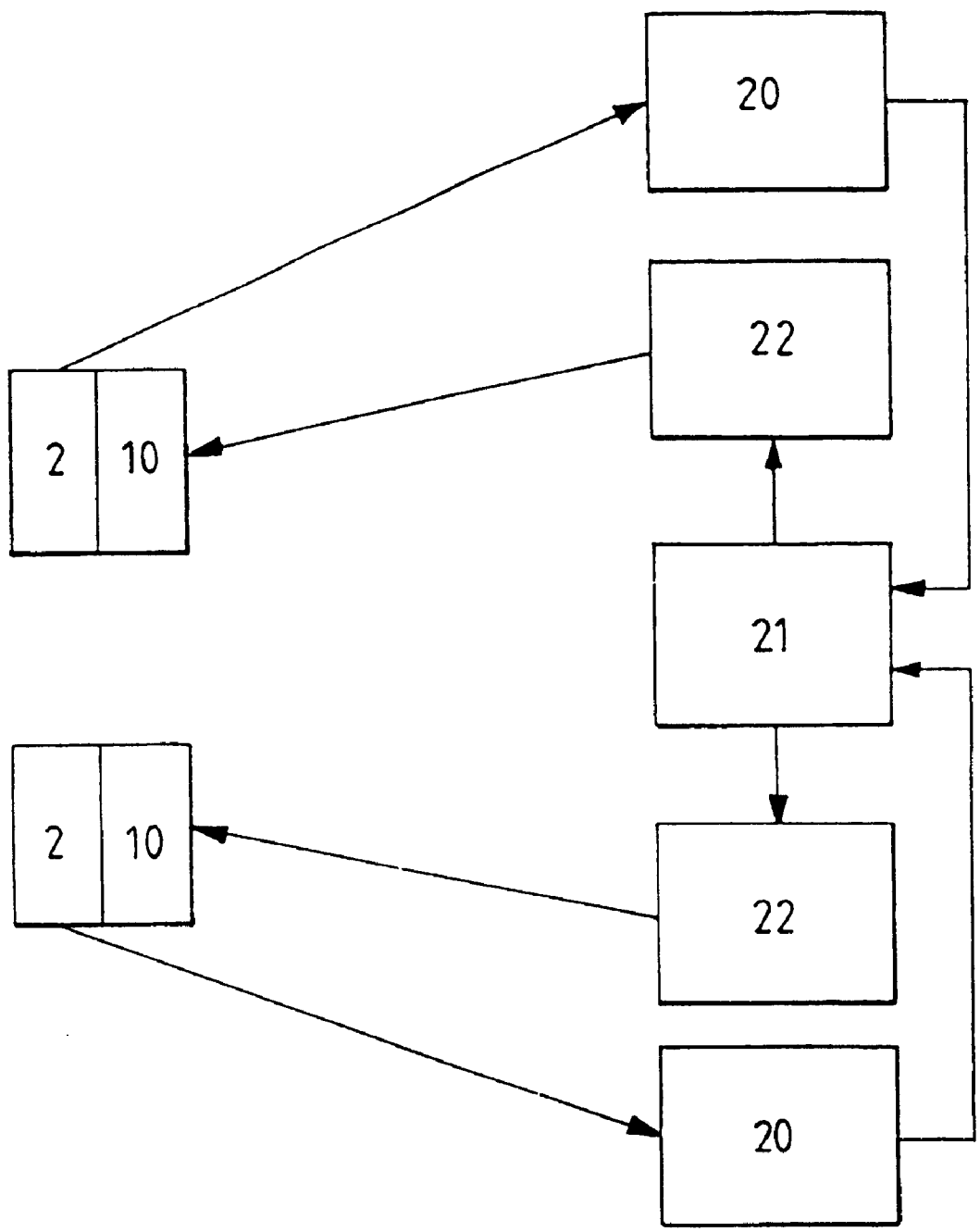
FIG. 7 is a block diagram of a control system for active deformation control.

In the embodiment shown in FIGS. 4–6, the U-profiles 3 of the beams 2 are joined together by means of rivets 30, of which some are provided with explosive charges 10. Weakening of the beams 2 is in this case achieved by exploding off these rivets 30 and thus breaking the joint between the U-profiles 3 at selected locations along the beam, as shown in FIGS. 6*a*–6*d*.

The invention has been described above with reference to examples in which the explosive charges 10 are applied directly to the beams 2. Other variants are of course also conceivable. For example, some form of gas generator arrangement can be used, which in a collision creates an over-pressure in cavities in the beam segments which will then rupture or be deformed in such a manner that the required weakening is achieved. In another embodiment (not shown), a gas generator arrangement can be used in another manner, so that the required over-pressure in the beam cavities is only permitted to increase so much that the cross-section profile of the beams is changed without any rupture occurring. In this manner, the rigidity can be increased, for example, by changing a square or rectangular cross-section of the beam so that it will become more or less circular or elliptical. In this case, the beams are made less rigid to adapt to a symmetrical frontal collision and are stiffened in the event of an offset collision.

What is claimed is:

1. Frontal structure in a vehicle, comprising a pair of laterally spaced beams, each comprising a sheet metal box element having greater length than both width and height, and having a portion which is oriented in the longitudinal direction of the vehicle, as well as means for sensing the retardation of the vehicle during a collision and, as a function thereof, changing the rigidity of the beam in its longitudinal direction, the beams are each coordinated with an individual retardation sensor, each disposed to send an individual retardation-dependent signal to a control unit, which is disposed to compare the signals and activate said means to change the rigidity of the beams depending on the difference between the signals from the retardation sensors.

2. Frontal structure according to claim 1, wherein the beams are each coupled to an individual activation device and that the control unit is arranged, during a collision, to send signals to the activation devices to activate means for reducing the rigidity of both beams, if the difference between the retardation signals is less than a predetermined lowest value.

3. Frontal structure according to claim 1, wherein the means for changing the rigidity of the beams comprise explosives.

4. Frontal structure according to claim 3, wherein the explosives comprise explosive charges spaced sequentially in a longitudinal direction of the beam and that the control unit is disposed to cause the explosive charges to detonate sequentially in the deformation direction of the beam.

5. Frontal structure according to claim 3, wherein the explosives are arranged upon detonation to dent the beam metal.

6. Frontal structure according to claim 3, wherein the beam consists of at least two sheet metal profiles joined to each other by means of fastener elements and that the explosives are arranged upon detonation to break the joint between the profiles.

7. Frontal structure according to claim 6, wherein the fastener elements are rivets and that the explosives are arranged upon detonation to blast free at least certain rivets.

8. An arrangement in a vehicle, said arrangement comprising:
   at least two beams forming at least a portion of a frame of a vehicle;
   at least one sensor per beam for determining a vehicle collision situation; and
   an adaptive arrangement for differently adjusting rigidity of each of said at least two beams dependent upon whether said vehicle collision situation is a substantially frontal collision or an offset collision.

9. The arrangement in a vehicle as recited in claim 8, wherein said arrangement is adapted to compare at least one detected value from each sensor and thereby discern between substantially frontal collisions and offset collisions.

10. The arrangement in a vehicle as recited in claim 8, further comprising:
    a control unit adapted to compare at least one detected value from each sensor thereby discerning between substantially frontal collisions and offset collisions.

11. An arrangement in a vehicle, said arrangement comprising:
    a pair of beams forming at least a portion of a frame of a vehicle;
    a pair of sensors for determining between at least two different types of vehicle collision situations; and
    an adaptive arrangement for differently adjusting rigidity of each of beam dependent upon the type of collision situation detected by said pair of sensors.

12. The arrangement in a vehicle as recited in claims 11, further comprising:
    a control unit adapted to compare at least one detected value from each of said pair of sensors thereby discerning between substantially frontal collisions and offset collisions.

13. The arrangement in a vehicle as recited in claim 12, further comprising:

explosive charges spaced sequentially in a longitudinal direction in each beam; and a control unit disposed to cause the explosive charges to detonate sequentially in the deformation direction of each beam.

14. The arrangement in a vehicle as recited in claim 12, further comprising:

explosives arranged for changing the rigidity of each beam.

15. The arrangement in a vehicle as recited in claim 14, further comprising:

the explosives arranged so that upon detonation the explosives dent the beam metal.

16. The arrangement in a vehicle as recited in clam 14, further comprising:

each beam comprises at least two sheet metal profiles joined to each other by fastener elements and the explosives are arranged so that upon detonation, the joint between the profiles is broken.

17. The arrangement in a vehicle as recited in claim 16, further comprising:

the fastener elements are rivets and that the explosives are arranged so that upon detonation at least certain rivets are blasted free.

* * * * *